H. GILLETT,
Assignor of one-half to J. H. GILLETT.
FIRE BOX ATTACHMENT FOR FARM ENGINE BOILERS.
No. 10,016. Reissued Jan. 24, 1882.
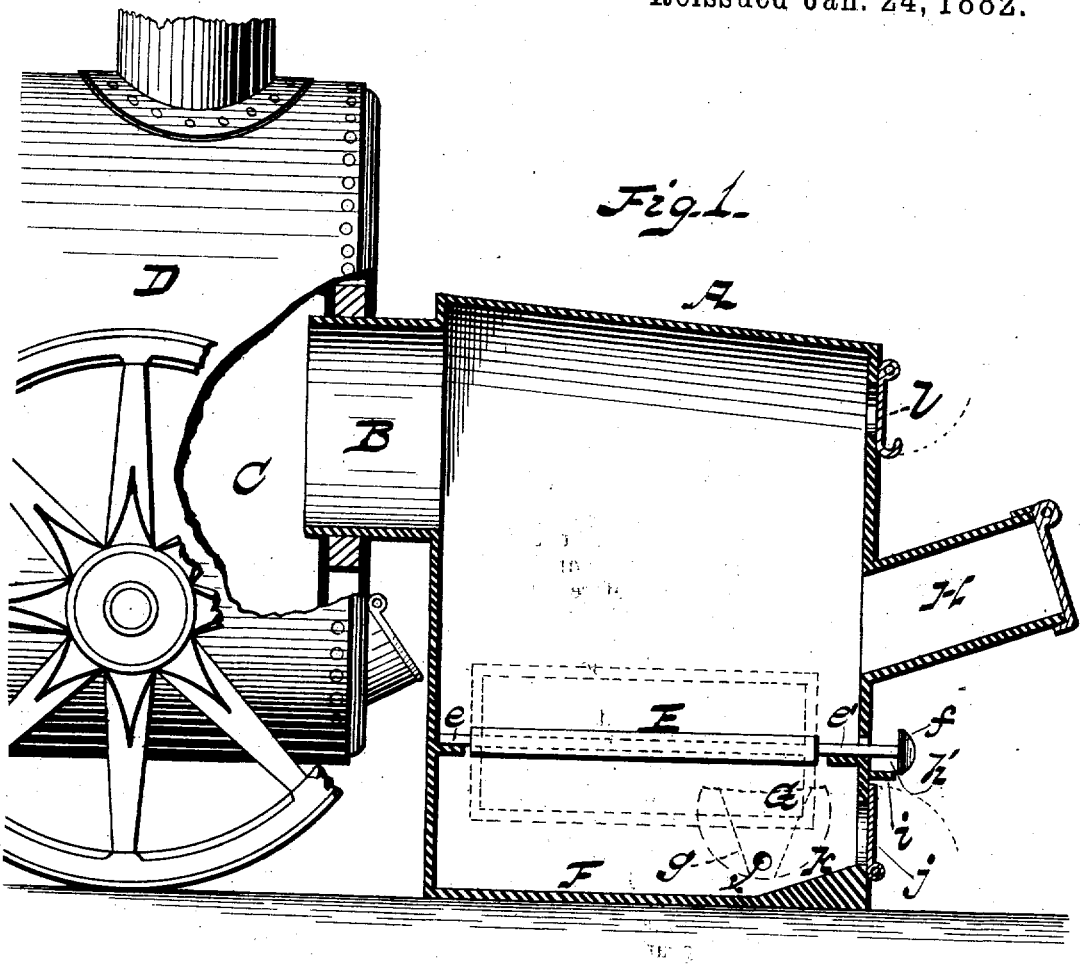
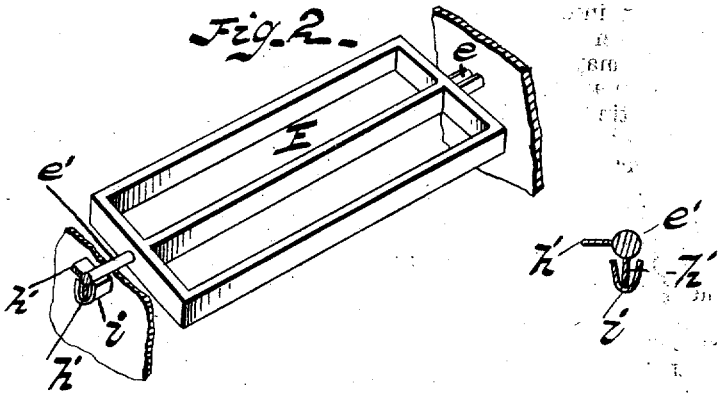
WITNESSES.
John A. Eias.
James J. Sheehy.
INVENTOR
Harrison Gillett
By Wm. H. Bates & Co.
his ATTORNEYS.
N. PETERS, Photo-Lithographer, Washington, D. C.

UNITED STATES PATENT OFFICE.

HARRISON GILLETT, OF LAKE CITY, MINNESOTA, ASSIGNOR OF ONE-HALF TO JAMES H. GILLETT, OF SAME PLACE.

FIRE-BOX ATTACHMENT FOR FARM-ENGINE BOILERS.

SPECIFICATION forming part of Reissued Letters Patent No. 10,016, dated January 24, 1882.

Original No. 222,270, dated December 2, 1879. Application for reissue filed October 8, 1881.

*To all whom it may concern:*

Be it known that I, HARRISON GILLETT, a citizen of the United States, residing at Lake City, in the county of Wabasha and State of Minnesota, have invented certain new and useful Improvements in Fire-Box Attachments for Farm-Engines; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention relates to a portable fire-box for utilizing straw, hay, shavings, and other light combustible materials as fuel. It is intended especially for use in connection with farm-engines, and to enable the burning of the straw upon the spot when grain is thrashed by steam-power.

It consists in an inclosed box or furnace provided with a flue leading from its upper portion and adapted for connection with a boiler-furnace, and having at a suitable level a horizontal series of wide rotatable grate-bars provided with projecting handles, a outwardly-projecting feed-chute leading into the box above the grate-bars and a water-chamber below said grate-bars. The flue may be shaped to fit into the door of any ordinary boiler-furnace. The outwardly-projecting feed-chute enables the straw to be easily fed, while by means of the rotatable grate-bars the cinders and ashes are readily broken up and prevented from becoming banked, and the water in the chamber below the grate-bars catches and condenses the light ashes, which would otherwise clog up the box and flues.

In the accompanying drawings, Figure 1 is a longitudinal vertical section of my improved fire-box connected to a farm-engine. Fig. 2 is a detached view of one of the grate-bars and a portion of the box-wall.

The letter A indicates the fire-box, and B the flue leading into the furnace C of the farm-engine boiler D through the doorway of said furnace.

The letter E designates one of the rotatable grate-bars, having journals *e e'* supported on suitable bearings projecting from the walls, the journal *e'* at the front being prolonged through the wall, and provided with a handle, *f*, and two short studs, *h h'*, projecting at right angles.

Just below the aperture through which the front journal-extension, *e'*, projects, is arranged a socket, *i*, adapted to receive the studs *h' h'* and prevent the grate-bar from rotating. The aperture is large enough, preferably elongated vertically, to permit the front journal of the grate-bar to be lifted a sufficient distance to disengage the studs from the socket, when desired, in order to rotate the bar. When the stud *h* is in the socket the grate-bar will be held in a horizontal plane to support the fuel; but when the stud *h'* is engaged in the socket the bar is held with its end edges vertical, so that the ashes and débris can drop through into the water-chamber. The grate bars may be, of course, rocked or shaken only sufficiently to loosen up the fuel, and then secured again horizontally.

The letter F indicates the water-chamber, the functions of which have been already described; and G designates a water pocket or funnel secured to the outer surface of the box-wall, and having an outlet, *g*, through said wall, by means of which water may be supplied to the water-chamber. The feed-chute H leads into the box above the grate-bars, and may extend outward any desired distance to enable the fuel to be fed through it safely and conveniently, said tube being provided with a suitable door at its outer end. The water chamber has arranged within it, in front of the ash-door *j*, an incline, *k*, over which the ashes may be raked out through said door. A draft-opening provided with a suitable door, *l*, is arranged in the front wall of the box, and by opening or closing this door and the ash-door *j* the activity of combustion of the fuel may be modified as desired. Through the upper door, *l*, also the fire may be watched.

My fire-box may be used in connection with any kind of boiler-furnace, and the manner of using it is obvious without particular explanation.

What I claim is—

1. The inclosed box provided with a flue leading from its upper portion and adapted for connection with a boiler-furnace, and having at a suitable level a horizontal series of wide rotatable grate-bars provided with projecting handle or handles, and outwardly-projecting feed-chute leading into the box above the grate-bars and a water-chamber below said grate-bars, substantially as described.

2. The fire-box A, having flue B, rotatable grate-bars E, water-chamber F, and a suitable fuel-feed opening, substantially as described.

3. In a fire-box, the combination, with the water-chamber below the grate-bars, of the water-pocket G, having near its bottom an opening leading into said water chamber, substantially as described.

4. In a fire-box, the water-chamber below the grate-bars, having arranged within it an incline, *k*, leading from the bottom thereof to the doorway, substantially as and for the purpose set forth.

5. A portable straw-burning detachable fire-box, having a grate and provided with an opening or door through which the straw may be fed, and having an opening or flue for applying the same to a farm-engine boiler for the purpose of generating steam, substantially as described.

In testimony whereof I affix my signature in presence of two witnesses.

HARRISON GILLETT.

Witnesses:

GEO. L. MATCHAN,

JAMES H. GILLETT.